United States Patent
Hahn et al.

(10) Patent No.: US 8,484,736 B2
(45) Date of Patent: Jul. 9, 2013

(54) STORAGE DEVICE HAVING AN ANTI-MALWARE PROTECTION

(75) Inventors: Judah Gamliel Hahn, Ofra (IL); Yaakov Ben-Tsvi, Ramat Hasharon (IL)

(73) Assignee: Sandisk IL Ltd., Kfar Saba (IL)

( * ) Notice: Subject to any disclaimer, the term of this patent is extended or adjusted under 35 U.S.C. 154(b) by 643 days.

(21) Appl. No.: 12/134,746

(22) Filed: Jun. 6, 2008

(65) Prior Publication Data
US 2009/0307452 A1 Dec. 10, 2009

(51) Int. Cl.
*G06F 11/00* (2006.01)
*G06F 13/00* (2006.01)

(52) U.S. Cl.
USPC .............................. 726/24; 711/163; 711/164

(58) Field of Classification Search
USPC ........................................................ 726/24
See application file for complete search history.

(56) References Cited

U.S. PATENT DOCUMENTS

| | | | |
|---|---|---|---|
| 6,526,489 B1 * | 2/2003 | Kikuchi et al. | 711/164 |
| 7,853,999 B2 * | 12/2010 | Khilnani et al. | 726/14 |
| 2002/0162015 A1 * | 10/2002 | Tang | 713/200 |
| 2006/0294370 A1 * | 12/2006 | Greenspan | 713/164 |
| 2007/0261118 A1 * | 11/2007 | Lu | 726/24 |
| 2007/0266063 A1 | 11/2007 | Camiel | |
| 2008/0052507 A1 * | 2/2008 | Chow et al. | 713/2 |
| 2008/0098478 A1 * | 4/2008 | Vaidya et al. | 726/24 |
| 2008/0134281 A1 * | 6/2008 | Shinde et al. | 726/1 |
| 2008/0162784 A1 * | 7/2008 | Obereiner et al. | 711/103 |

* cited by examiner

*Primary Examiner* — Teshome Hailu
(74) *Attorney, Agent, or Firm* — Toler Law Group, PC

(57) ABSTRACT

A storage device is protected, when interfaced with a host device, by operating a security processor of the storage device in a "security" mode in which the security processor filters commands that are received from the host device and are targeted to the storage controller, and upon determining by the security processor that the "security" mode is no longer required, by operating the security processor in a "safe" mode in which the security processor (i) does not filter commands it receives from the host device and (ii) forwards to a storage controller of the storage device such unfiltered commands.

23 Claims, 4 Drawing Sheets

STORAGE DEVICE HAVING AN ANTI-MALWARE PROTECTION

FIELD OF THE INVENTION

The present invention generally relates to storage devices and more specifically to a portable storage device that is provided with an anti-malware protection means.

BACKGROUND

Use of non-volatile based storage devices has been rapidly increasing over the years because they are portable and they have small physical size and large storage capacity. Storage devices come in a variety of designs. Some storage devices are regarded as "embedded", meaning that they cannot, and are not intended to customarily be removed by a user from a host device with which they operate. Other storage devices are removable, which means that the user can move them from one host device to another, or replace a storage device with another. Other storage devices, which are commonly known as "Disk-on-Key" devices, are provided with a Universal Serial Bus ("USB") interface in order to allow them to be connected to a computer system, for example. A flash storage device that is provided with a USB interface is also known in the field as a USB Flash Drive, or UFD. MultiMedia Card ("MMC"), Secure Digital ("SD"), miniSD, and microSD, are exemplary flash storage devices that are used with a variety of host devices such as multimedia players (e.g., MP3 and MP4 players), digital cameras, computer laptops, Global Positioning System ("GPS") devices, and so on.

When a removable storage device is connected to a host device, a handshake phase is commenced. Briefly, handshaking is an automated process of negotiation that dynamically sets parameters of a communication channel established between two entities (e.g., a host device and an external storage device) before normal communication over the channel begins. That is, handshaking is triggered by the establishment of the physical channel and it precedes the establishment of the logical channel and normal information transfer. During handshake, a computer system establishes rules for communication with the external device with which it is going to communicate, which rules may refer, for example, to information transfer rate, coding alphabet, communication protocol, hardware features, and so on.

Various forms of malware can automatically infect a media that was just connected to a compromised computer system. For example, merely mounting a USB drive, or a memory card, and in general any like portable storage device, into an infected host device may be enough to transfer a malware to the portable storage device. Infecting the portable storage device by a host device may happen during a time window between the completion of the handshake phase and the time at which the host loads an anti-malware application from the storage device. Because executing an anti-malware application usually requires large computing resources, it has to be loaded from the storage device into, and be executed on, the host device rather than on the storage device. However, loading an anti-malware application to the host device and launching it takes time during which the storage device is susceptible to virus attacks from the host device.

There are storage devices that are not provided with an anti-virus or an anti-malware application and, therefore, they have to rely on their host device's anti-virus capability. However, when such a storage device is connected to a host device, it takes a while before the host device acknowledges to the storage device that the storage device can trust the host device's anti-virus capability. Until then the storage device may be infected with a virus.

Some portable storage devices are provided with an anti-virus or an anti-malware application to protect the integrity of the data stored therein, and to protect the storage device in general. However, because of the storage device's limited computational power and resources required to execute anti-virus applications, such applications are usually executed on the host device with which a storage device operates rather than by the storage device. Therefore, in order to provide to the storage device the anti-virus protection it requires, one of the initialization steps taken by the storage device during the storage device's initialization phase involves transferring, by the storage device, the anti-virus application to the host device, on which it can run. So long as the storage device's anti-virus application is not running on the host device the storage device can be infected with viruses.

FIG. 1 shows a typical storage device 100. Storage device 100 typically includes a storage area 110 for storing digital data, a storage controller 120 that manages storage area 110 via data and control lines 130 and communicates with host device 140 via host interface 150. Storage area 110 may be of a NAND flash variety.

Storage controller 120 controls all of the data storage and data retrieval to/from storage area 110 and data transfer to/from host device 140. Storage area 110 may contain user and other types of files, protected data that is allowed to be used only by authorized host devices, and security data that is used internally, by storage controller 120. Host devices (e.g., host device 140) cannot directly access storage area 110. That is, if, for example, host device 140 asks for, or needs data from, storage device 100, host device 140 has to request it from storage controller 120, regardless of where in storage area 110 the requested data is held.

When storage device 100 is connected to host device 140, storage device 100 remains virus-wise unprotected until anti-virus application 115 is downloaded to, and executed on, host device 140. Alternatively, if storage device 100 is not provided with an anti-virus application such as anti-virus application 115, storage device 100 has no option other than to trust host device 140 that host device 140 is executing a proper anti-virus application of its own. "Knowing", by storage device 100, whether host device 140 can be trusted virus-wise takes time (i.e., the handshake and initialization periods) during which the storage device may be infected by host device 140.

The presence of malware and viruses in a host is therefore an information security and integrity issue. Therefore there is a need to deal with this issue in order to better protect storage devices, for example when they are initialized.

SUMMARY

It would, therefore, be beneficial to have a method that would allow a storage device to protect itself during handshake and initialization phases; that is, until the host device with which it operates takes on anti-malware responsibility.

The following embodiments and aspects thereof are described and illustrated in conjunction with systems, tools, and methods, which are meant to be exemplary and illustrative but not limiting in scope.

According to the present disclosure a storage device is provided with an anti-malware capability that is exercised until a host device with which the storage device operates takes on the anti-malware task. That is, the storage device is protected, when interfaced with the host device, by operating a security processor of the storage device in a "security" mode in which the security processor filters commands that are received from the host device and are targeted to the storage controller, and upon determining by the security processor that the "security" mode is no longer required, by operating the security processor in a "safe" mode in which the security processor (i) does not filter commands it receives from the host device and (ii) forwards to a storage controller of the storage device such unfiltered commands.

According to the present disclosure a method of protecting a storage device when interfacing with a host device is provided, the method including operatively interfacing a storage device with a host device, the storage device including a storage area for storing the digital data, a storage controller for managing the storage area, and a security processor, where, upon interfacing the storage device with the host device, the security processor is operating in a "security" mode, in which the security processor filters commands that are received from the host device and are targeted to the storage controller, and upon determining by the security processor that the "security" mode is no longer required, the security processor is operating in a "safe" mode in which the security processor (i) does not filter commands it receives from the host device and (ii) forwards to the storage controller such unfiltered commands. A "command", as used herein, can also be referred to as a "message" or "data packet", depending on the communication protocol used by the storage device and host device.

In one embodiment of the present disclosure the storage device is a removable storage device. In another embodiment of the present disclosure the storage device is a fixed storage device, for example, an embedded or incorporated storage device. In yet another embodiment of the present disclosure the storage device contains flash memory.

In an embodiment of the present disclosure operating the security processor in the "security" mode includes receiving, by the security processor, a command from the host device; storing in the storage area, by the security processor, the received command, information pertaining to the received command, or both; and determining, by the security processor, whether the received command is alertable.

If the received command is determined to be alertable, the security processor logs the received command in a command alert log ("CAL") and, depending on the command or on the implications of its execution by the storage controller, the security processor may decide: (1) to block the command from reaching the storage controller, (2) to block the command from reaching the storage controller and notify the host device that the command was executed on the storage device normally or as expected by the host device, (3) to ignore the command, or (4) to pass the command on to the storage controller. If, however, the received command is non-alertable, the security processor passes the received command to the storage controller as is.

In one embodiment of the present disclosure the security processor allows the host device to access the command alert log responsive to the security processor transitioning from the "security" mode to the "safe" mode, and while in the "safe" mode.

In one embodiment of the present disclosure determination by the security processor whether the received command is alertable is contingent on a previously received command or on a sequence of previously received commands. In another embodiment of the present disclosure determination by the security processor whether the received command is alertable is contingent on security rules. In yet another embodiment of the present disclosure determination by the security processor whether the received command is alertable is contingent on security rules in conjunction with security rules. The sequence of previously received commands may include alertable commands that are interspersed within other commands.

In one embodiment of the present disclosure transition of the security processor from the "security" mode to the "safe" mode is triggered by one of (1) a message received from the host device, (2) a message received over a secure session that is established between the storage device and the host device, and (3) a signal received at the security processor from the host during mutual authentication between the storage device and the host device. The secure session may be established, for example, by using a key-exchange mechanism such as the key-exchange mechanism employed by the IEEE 1667 Authentication Silo.

In addition to the exemplary aspects and embodiments described above, further aspects and embodiments will become apparent by reference to the figures and by study of the following detailed description.

BRIEF DESCRIPTION OF THE DRAWINGS

Exemplary embodiments are illustrated in referenced figures. It is intended that the embodiments disclosed herein are illustrative rather than restrictive. The disclosure, however, may better be understood with reference to the following detailed description when read with the accompanying figures, in which.

Figure 2:
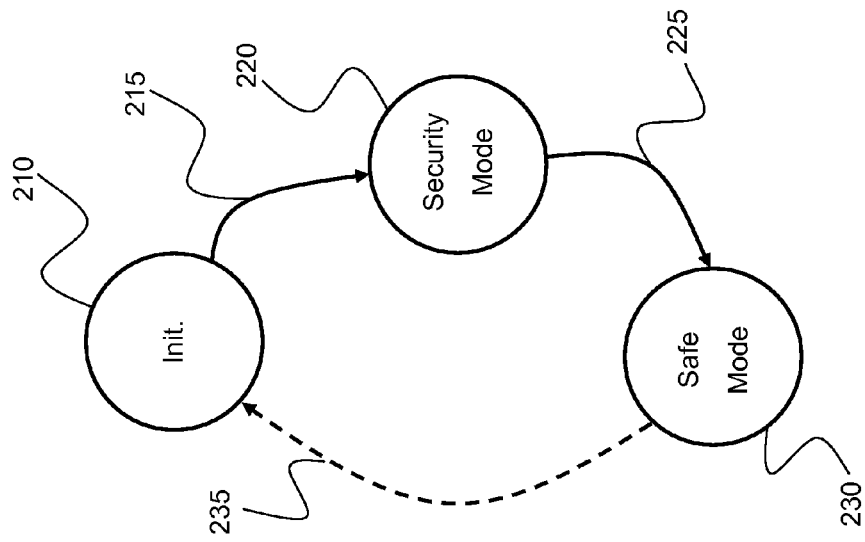
FIG. 2 is a device initialization state machine.
Figure 1:
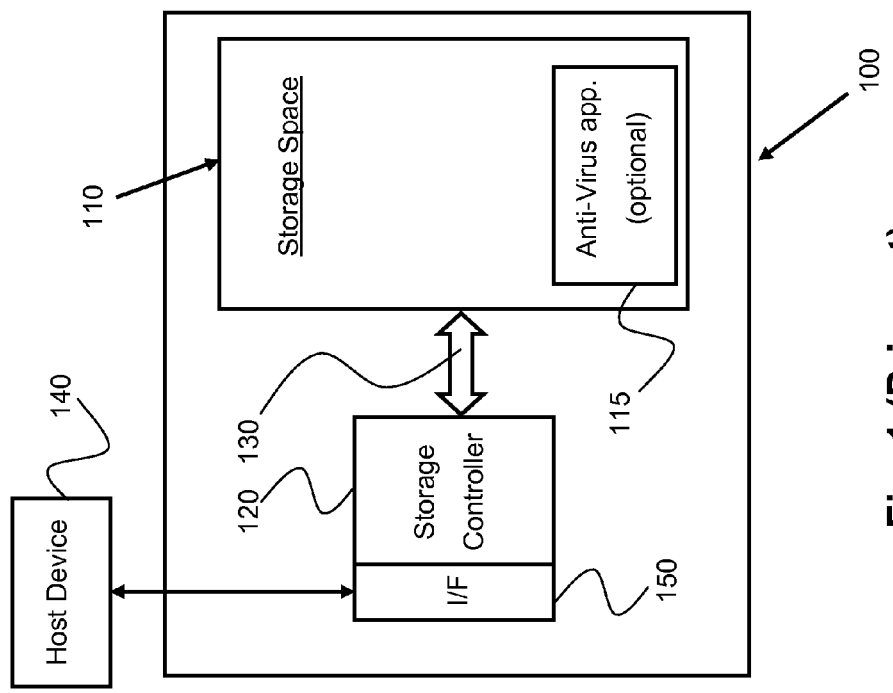
FIG. 1 (prior art) is a block diagram of a typical portable storage device.

It will be appreciated that for simplicity and clarity of illustration, elements shown in the figures are not necessarily drawn to scale. Further, where considered appropriate, reference numerals may be repeated among the figures to indicate like, corresponding or analogous elements.

DETAILED DESCRIPTION

The claims below will be better understood by referring to the present detailed description of example embodiments of the invention. This description is not intended to limit the scope of claims but instead to provide examples of the invention.

FIG. 2 is a device initialization state machine. According to the present disclosure a storage device is protected, when interfaced with a host device, by operating a security processor of the storage device in a "security" mode in which the security processor filters commands that are received from the host device and are targeted to the storage controller, and upon determining by the security processor that the "security" mode is no longer required, by operating the security processor in a "safe" mode in which the security processor does not filter commands it receives from the host device but rather it forwards to a storage controller of the storage device unfiltered commands.

In other words, upon operatively connecting the storage device to the host device the storage device enters an initialization phase 210 during which the storage device and the host device learn each other's capabilities. Subsequent to the commencing of the initialization phase 210 the security processor of the storage device enters 215 the "security" mode (shown at 220) in which the security processor monitors and filters commands issued by the host device. If a current host command is, or it includes, an "all clear" message, which indicates to the security processor that a proper anti-malware application is already running on the host device and therefore the storage device is virus-wise protected, the security processor enters or transitions 225 to the "safe" mode (shown at 230). If the storage device is operatively disconnected from the host device and thereafter reconnected, the storage device commences 235 the initialization phase (shown at 210) and the methodology described above is repeated.

Figure 3:
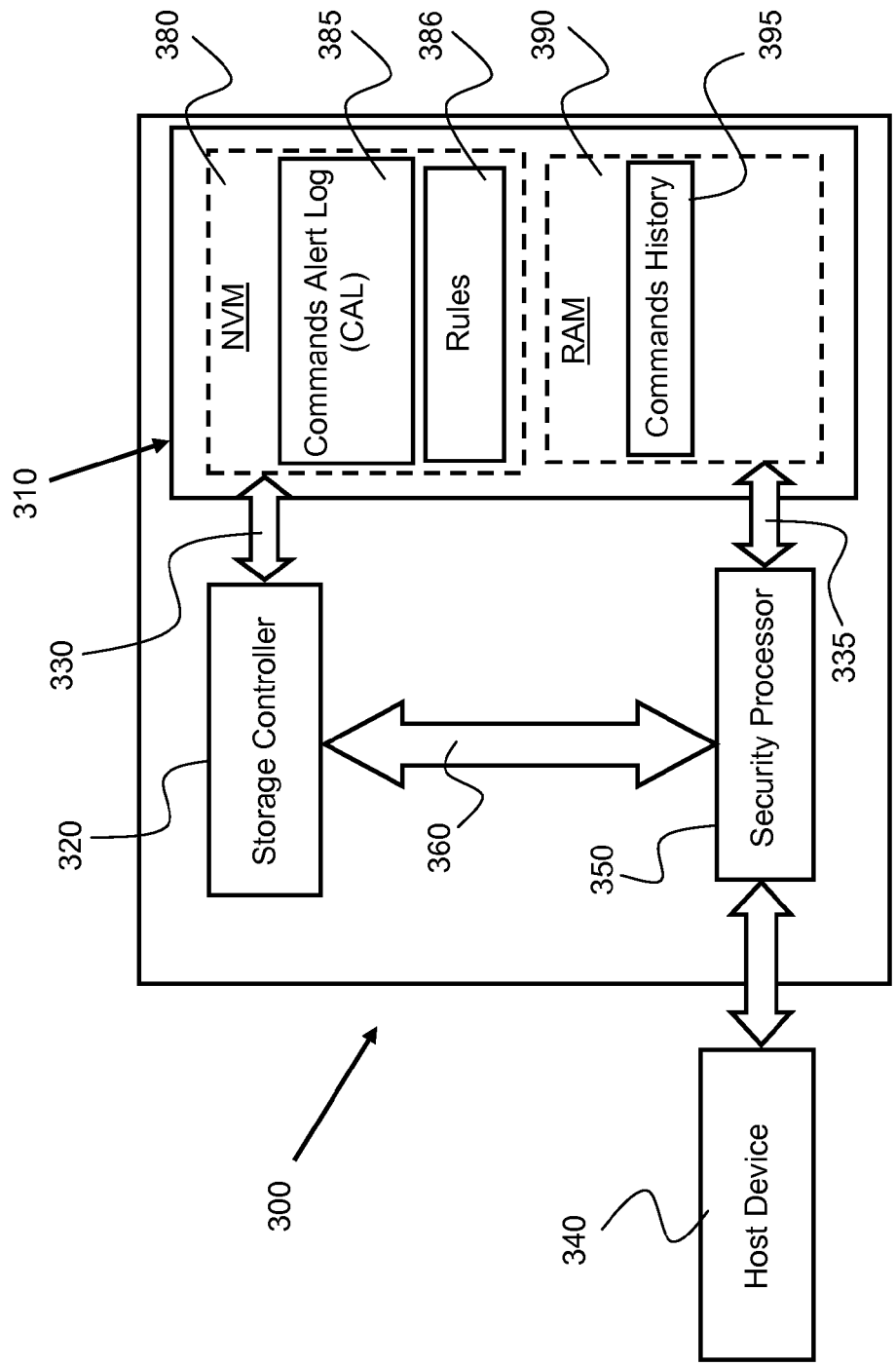
FIG. 3 is a block diagram of a portable storage device according to an example embodiment.

FIG. 3 is a block diagram of a storage device 300 according to an example embodiment. Storage device 300 includes a storage area 310 for storing data, a storage controller 320 to manage storage area 310 via data and control bus 330, and a security processor 350 that is functionally located between storage controller 320 and host device 340. Storage area 310 may include a non-volatile memory ("NVM") area 380, which may be of a NAND flash variety, and a volatile memory area 390, which may be, for example, a Random Access Memory ("RAM"). Security processor 350 may interface with RAM 390 by using a bus independent of bus 330, for example by using data and control bus 355.

Storage controller 320 controls all the data transfer to/from storage area 310 and data transfer to/from host device 340 by controlling, for example, "read", "write" and "erase" operations, wear leveling, and so on. Storage area 310 may contain user files, other types of files, protected data that are allowed to be used only by authorized host devices, and security data that are allowed to be used only internally, by storage controller 320. Host devices (e.g., host device 340) cannot directly access storage area 310. That is, if, for example, host device 340 asks for, or needs data from, storage area 310, host device 340 has to request it from storage controller 320. Host 340 cannot directly communicate with storage controller 320, except via security processor 350, regardless of whether security processor 350 operates in the security mode or in the safe mode.

Upon connection of storage device 300 to host device 340 both devices commence an initialization process that involves, among other things, exchanging information related to anti-virus capabilities. If storage device 300 has an anti-virus application similar to anti-virus 115 of storage device 100, storage controller 320 transfers it (i.e., the anti-virus application) to host device 340 during the initialization phase, and waits until it receives from host device 340 an "all clear" message that indicates to security processor 350 that the anti-virus application transferred to host device 340 is running on host device 340. If storage device 300 does not have such an application, it waits until it receives from host device 340 an "all clear" message that some other anti-virus application, which is trusted by storage device 300, is running on host device 340.

While the initialization phase is in progress and as long as host device 300 does not receive the "all clear" message, or the indication, from host device 340, security processor 350 operates in a mode of operation referred to herein as the "security" mode, in which security processor 360 monitors and filters commands that are targeted to storage controller 320.

Upon security processor 350 receiving the "all clear" message or indication from host device 340 security processor 350 transitions from the "security" mode to a mode of operation referred to herein as the "safe" mode, in which security processor 350 is command-wise transparent to storage controller 320; namely, security processor 350 stops monitoring commands and passes them to storage controller 320 as is via internal communication path 360.

While security processor 350 is operating in the "security" mode, security processor 260 determines which, or if any, of the monitored commands is alertable and logs (i.e., stores or records) in Command Alert Log ("CAL") 385 alertable commands along with alert information that are related or pertain to the alertable commands. In addition, security processor 350 temporarily stores commands in commands history 395; namely, processor 350 stores in volatile memory 390 monitored commands, and/or information associated with these commands, while the "security" mode prevails. By "alertable command" is meant herein a command that poses a virus threat to the storage device in itself or in conjunction with other previously received command(s) and/or future command(s). In other words, a determination that a received command poses a virus threat may sometimes depend on the context of the command.

The storage portion dedicated in storage area 310 for CAL 385 and commands history 395 is relative small because, as explained above, security processor 350 operates in the "security" mode only for a short time period, which is the time period required to complete the initialization and handshake phases. Therefore, it is expected that only a relatively small number of commands will be received from host device 340 during that time period, including those commands which are suspected or identified by security processor 350 as posing a virus threat to storage device 300. The relatively small number of commands is contingent on the number and type, or nature, of the rules stored in NVM 380.

Commands history 395 is stored in a volatile memory 390 because the content of commands history 395 is used by security processor 350 only during the initialization phase to determine whether a currently received command poses or implies a virus threat. This means that commands history 395 has no function when security processor 350 operates in the "safe" mode, for which reason losing such history information after security processor 350 transitions to the "safe" mode does not pose a problem. Put otherwise, the content of commands history 395 is relevant only for an initialization session during which the commands history is logged: this content has no meaning for other initialization sessions because each initialization session creates, or results in, its own commands history content. The content of commands history 395 may, therefore, be allowed to be deleted as soon as security processor 350 transitions from the security mode to the safe mode.

Unlike commands history 395, it may be beneficial to store commands alert log (CAL) 385 in a non-volatile memory such as NVM 380 because such information may be of interest to host device 340 some time in the future. For example host device 340 may use the information stored in CAL 385 to enhance its anti-malware capability, which may be beneficial to storage device 300.

Also stored in NVM 380 are rules 386 that security processor 350 uses in conjunction with the currently received host command, and possibly with previously received commands, to determine, or to assess, whether the currently received host command poses a virus threat.

Security processor 350 determines whether a received command is alertable based on the command itself, or on a previously received command, or on a sequence of previously received commands where the sequence of previously received commands includes alertable commands that are interspersed within other commands, or on security rules, or on any combination thereof.

Figure 4:
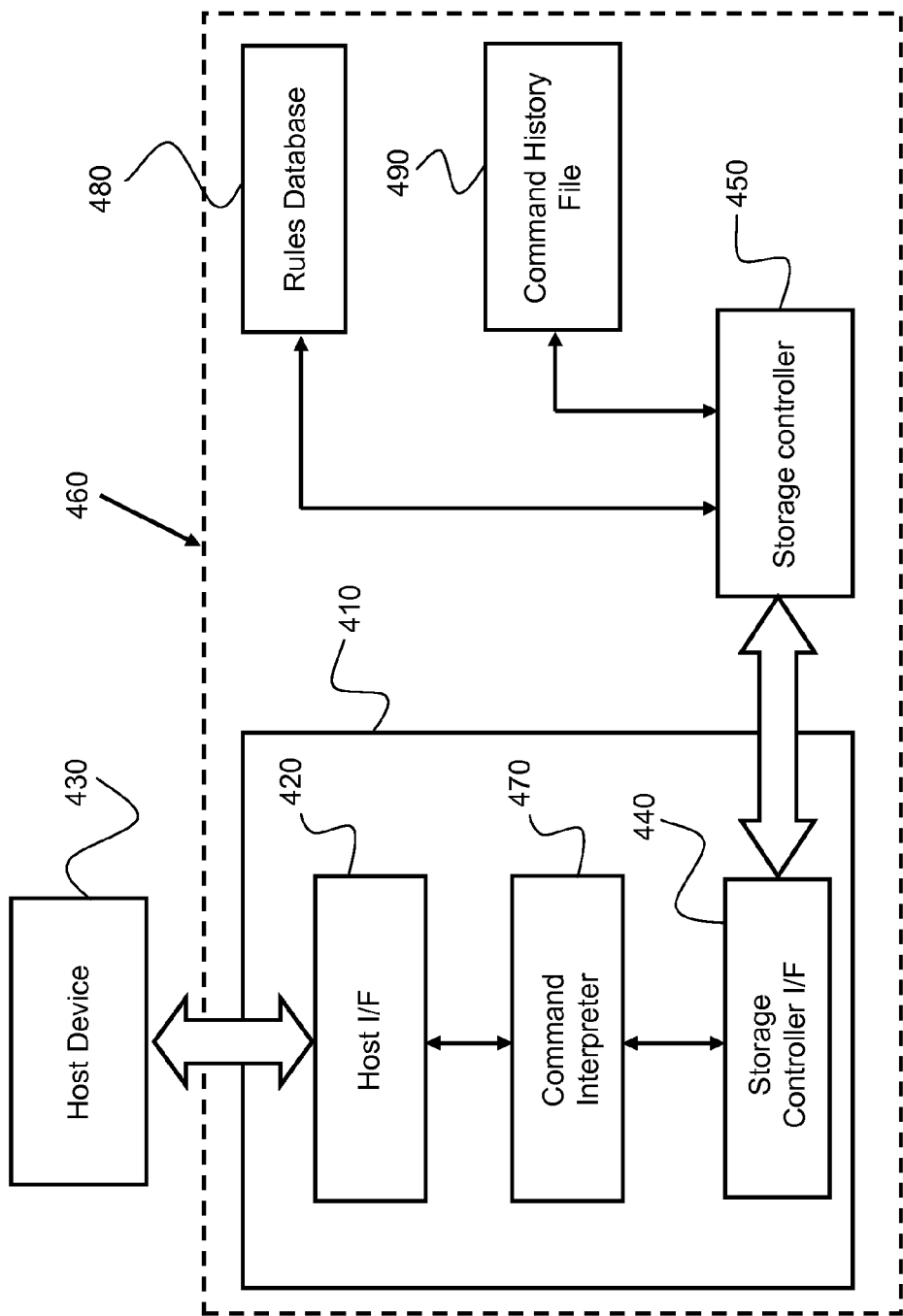
FIG. 4 schematically illustrates a security processor according to an example embodiment.

FIG. 4 is a block diagram of a security processor 410 according to an example embodiment. Security processor 410 includes a host interface 420 for communicating with host device 430, a storage device interface 440 for communicating with storage controller 450 of storage device 460, and a command interpreter 470 for interpreting a command that is received from host device 430 while security processor 410 operates in the "security" mode. Command interpreter 470 then searches in rules database 480 for rules that should be enforced on the interpreted command. For example, if the command is a command to write data into Logical Block Address ("LBA") #0 of the storage device (not shown in FIG. 4), command interpreter 470 may find in rules database 480 a rule that forbids such data writing (because LBA #0 holds a boot software program), and perhaps also a rule that "tells" command interpreter 470 to ignore the command, to notify host device 430 of the suspected command, and so on.

Command interpreter 470 may use information that is stored in command history 490 to interpret the command. The information may pertain to one or more previously received commands or to a series of previously received commands, where the series of previously received commands may include one or more alretable commands that may be interspersed between other commands or commands that are subject to alert.

In order to interpret a received command, command interpreter 470 may use rules in rules database 480 to "judge" whether a received command, whether in itself or in conjunction with a series of previously received commands, is expected or "reasonable", or not. If the command is not expected or it is not reasonable, command interpreter 470 may mark it in an associated CAL log as "alertable", and update the CAL log with information pertaining to the alertable command. Command interpreter 470 can judge a received command because command interpreter 470 "knows" which memory sector(s) the host device 430 is trying to write data into or to read data from, and trying to write data into "sensitive" memory sectors, for example into a boot sector, will be judged, and consequently, treated, by command interpreter 470 as a virus threat.

Transition of security processor 410 from the "security" mode to the "safe" mode may be triggered by a message that is received from host device 430, or by a message that is received over a secure channel that is established between storage device 460 and host device 430, or by a signal that is received at security processor 350 from host device 430 during mutual authentication between storage device 460 and host device 430. The secure channel may be established, for example, by using a key-exchange mechanism that is identical or similar to the key-exchange mechanism employed by IEEE 1667 Authentication Silo. Briefly, IEEE 1667 ("Standard Protocol for Authentication in Host Attachments of Transient Storage Devices") is a standard that describes a method for authenticating storage devices such as USB flash drives when they are interfaced with a computer. IEEE 1667 is referenced in more detail in "Authentication in Transient Storage Device Attachments" (an article by Donald Rich, April 2007).

Figure 5:
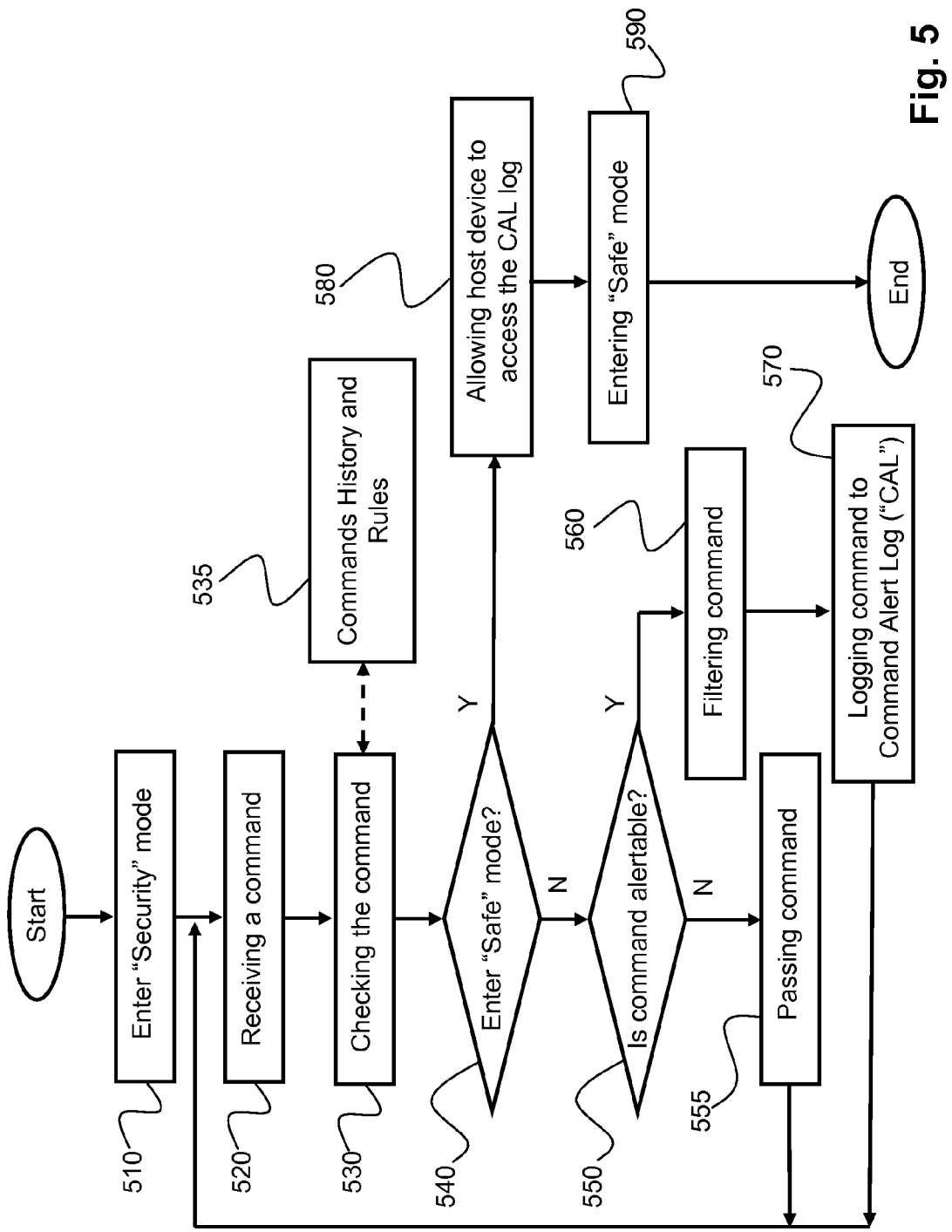
FIG. 5 shows an anti-virus protection method according to an example embodiment.

FIG. 5 shows an anti-virus method according to an example embodiment. FIG. 5 will be described in association with FIG. 3. When storage device 300 is connected to host device 340, security processor 350 enters, at step 510, the "security" mode of operation. At step 520, security processor 350 receives a command from host device 340 and, at step 530, it checks the received command by using predefined rules and commands history (shown at 535).

If at step 540 security processor 350 determines that the command currently received from host device 340 does not include an "all clear" message (shown as "N" at step 540), security processor 350 checks, at step 550, whether the command currently received from host device 340 is alertable; that is, if it poses a virus threat.

If the command currently received from host device 340 is not alertable (shown as "N" at step 550), security processor 350 passes, at step 555, the command to storage controller 320 and, at step 520, waits to receive another command from host device 340. In addition, security processor 350 stores, or logs, in commands history 395 the command, and, optionally, information related to the command.

If, however, the command currently received from host device 340 is alertable (shown as "Y" at step 550), security processor 350 filters, at step 560, the command and, at step 570, it logs in CAL 385 the command, information related to the command (e.g., information relating to the command's execution result), or both. In other words, depending on the received command filtering a command by security processor 350 may have one of the following consequences: (1) security processor 350 stores a corresponding alert in CAL 385 and prevents the command (i.e., blocks the command) from reaching storage controller 320, or (2) security processor 350 stores a corresponding alert in CAL 385 and passes the command to storage controller 320. In the former case (i.e., consequence (1)) security processor 350 may pose itself to host device 340 as storage controller 320, and notify host device 340 that the command was handled "normally"; i.e., as expected by host device 340. Alternatively, if host device 340 is a trusted device security processor 350 may send a failure message to host device 340 that the command sent by host device 340 was blocked or ignored for being suspected as a virus threat. In the latter case (i.e., consequence (2)) security processor 350 may also store in CAL 385 information regarding, for example, the reason why the command was passed to storage controller 320 even though the command was alertable, and consequences of the execution of the command by storage controller 320.

Regarding step 540, if security processor 350 determines that the command currently received from host device 340 includes an "all clear" message (shown as "Y" at step 540), security processor 350 allows, at step 580, host device 340 to access the information recorded so far in CAL 385 and, thereafter, at step 590, security processor 350 enters the "safe" mode, which means that host device 340 is allowed, from now on, to communicate with storage controller 320 "normally"; i.e., without security processor 350 filtering host commands or otherwise intervening in the communication between host device 340 and storage device 300.

If NVM storage area 380 includes flash memory, then storage controller 320 is provided with a flash memory interface that enables storage controller 320 to manage the flash memory, where managing the flash memory includes writing data into and reading data from flash memory cells array, and erasing memory cells. Security processor 350 does not have such an interface and, therefore, security processor 350 can write data into, and read data from NVM 280 only through storage controller 320.

The articles "a" and "an" are used herein to refer to one or to more than one (i.e., to at least one) of the grammatical object of the article, depending on the context. By way of example, depending on the context, "an element" can mean one element or more than one element. The term "including" is used herein to mean, and is used interchangeably with, the phrase "including but not limited to". The terms "or" and "and" are used herein to mean, and are used interchangeably with, the term "and/or," unless context clearly indicates otherwise. The term "such as" is used herein to mean, and is used interchangeably, with the phrase "such as but not limited to".

Having thus described exemplary embodiments of the invention, it will be apparent to those skilled in the art that modifications of the disclosed embodiments will be within the scope of the invention. Alternative embodiments may, accordingly, include more modules, less modules, and/or functionally equivalent modules. The present disclosure is relevant, mutatis mutandis, to various types of portable storage devices such as SD-based flash memory cards, flash memories, and non-flash storage devices.

What is claimed is:

1. A method comprising:
    in a storage device having a host interface, the storage device including a storage area for storing data, a storage controller for managing the storage area, and a security processor, performing, while the storage device is operatively coupled to a host device via the host interface:
        in response to initialization of the storage device, operating the storage device in a security mode, wherein operating the storage device in the security mode includes:
            receiving a command from the host device,
            determining, by the security processor, whether the received command includes an indication from the host device that an anti-virus application is executing on the host device,
            when the received command includes the indication, transitioning from operating the storage device in the security mode to operating the storage device in a safe mode,
            when the command does not include the indication, determining whether the received command poses a security threat,
            when the received command poses the security threat, logging, by the security processor, the received command in a command alert log, storing at least one of the received command and information associated with the received command in a volatile memory in the storage area, blocking the received command from reaching the storage controller, and notifying the host device that the command was executed as expected by the host device, and
            when the received command does not pose the security threat, passing the received command to the storage controller, and
        wherein operating the storage device in the safe mode includes forwarding to the storage controller commands received from the host device without filtering the commands received from the host device.

2. The method of claim 1, wherein the storage device is embedded in the host device.

3. The method of claim 1, wherein the storage device contains flash memory.

4. The method of claim 1, wherein the received command poses the security threat on its own, in conjunction with a previously received command, in conjunction with a subsequently received command, or any combination thereof.

5. The method of claim 1, further comprising, responsive to transitioning from operating the storage device in the security mode to operating the storage device in the safe mode, permitting the host device to access the command alert log.

6. The method of claim 1, wherein a determination by the security processor of whether the received command poses the security threat is contingent on a previously received command or on a sequence of previously received commands.

7. The method of claim 6, wherein the sequence of previously received commands includes one or more commands that pose the security threat interspersed among other commands.

8. The method of claim 1, wherein a determination by the security processor of whether the received command poses the security threat is contingent on security rules.

9. The method of claim 1, wherein the indication includes one of a message received from the host device, a message received over a secure session that is established between the storage device and the host device, and a signal received at the security processor from the host device during mutual authentication between the storage device and the host device.

10. The method of claim 9, wherein the secure session is established using a key-exchange mechanism.

11. The method of claim 1, wherein the storage device is in the security mode during a first time period and is in the safe mode during a second time period, wherein the second time period is after the first time period.

12. The method of claim 11, wherein the second time period begins in response to the indication.

13. The method of claim 12, wherein the anti-virus application includes one of a host-based anti-virus application executing on the host device when the storage device is operatively coupled to the host device and a storage device-based anti-virus application transferred to the host device for execution in response to the storage device being operatively coupled to the host device.

14. The method of claim 1, further comprising re-entering the security mode in response to operatively interfacing the storage device with the host device after the storage device has been decoupled from the host device.

15. The method of claim 1, further comprising transitioning from operating the storage device in the security mode to operating the storage device in the safe mode in response to the storage device receiving an all clear message from the host device indicating that the anti-virus application is executing on the host device.

16. The method of claim 1, wherein the at least one of the received command and the information associated with the received command is stored in a commands history file in the volatile memory in the storage area.

17. The method of claim 1, wherein the indication from the host device indicates that the anti-virus application executing on the host device is trusted.

18. A data storage device comprising:
    a host interface configured to enable communications with a host device while the data storage device is operatively coupled to the host device;
    a memory configured to store data;
    a storage controller configured to receive commands from the host device and to transfer data between the host device and the memory in response to the commands received from the host device; and
    a security processor operatively coupled to the host interface and to the storage controller, the security processor configured to operate the storage device in a security mode and in a safe mode,
    wherein while operating the storage device in the security mode, the security processor is further configured to:
        receive a command from the host device,
        determine whether the received command includes an indication from the host device that an anti-virus application is executing on the host device, when the received command includes the indication, transition from operating the storage device in the security mode to operating the storage device in the safe mode, when the received command does not include the indication, determine whether the received command poses a security threat, when the received command poses the security threat, log the received command in a command alert log, store at least one of the received command and information associated with the received command in a volatile memory area in the memory, block the received command from reaching the storage controller, and notify the host device that the command was executed as expected by the host device, and when the received command does not pose the security threat, pass the received command to the storage controller, and wherein while operating the storage device in the safe mode, the security processor is further configured to forward to the storage controller commands received from the host device without filtering the commands received from the host device.

19. The data storage device of claim 18, wherein the data storage device is embedded in the host device.

20. The data storage device of claim 18, wherein the security mode is entered in response to the data storage device detecting a connection with the host device.

21. The data storage device of claim 20, wherein the anti-virus application is stored in the memory, and wherein the security processor is further configured, in response to detecting the connection with the host device, to cause the anti-virus application to be transferred to the host device for execution.

22. The data storage device of claim 18, wherein the data storage device is one of:
   a universal serial bus (USB) flash drive;
   a Secure Digital (SD) card;
   a mini SD card;
   a micro SD card;
   a MultiMedia Card (MMC); and
   a solid state drive.

23. The data storage device of claim 18, wherein the received command poses the security threat on its own, in conjunction with a previously received command, in conjunction with a subsequently received command, or any combination thereof.

* * * * *